(12) United States Patent
Goolkasian

(10) Patent No.: US 6,947,352 B2
(45) Date of Patent: Sep. 20, 2005

(54) AUDIO RECORDING PLAYBACK DEVICE

(76) Inventor: Aaron J. Goolkasian, 5503 Gordonvale Pl., Charlotte, NC (US) 28226

( * ) Notice: Subject to any disclaimer, the term of this patent is extended or adjusted under 35 U.S.C. 154(b) by 269 days.

(21) Appl. No.: 10/195,938

(22) Filed: Jul. 15, 2002

(65) Prior Publication Data

US 2003/0117908 A1 Jun. 26, 2003

Related U.S. Application Data

(63) Continuation-in-part of application No. 29/152,730, filed on Dec. 21, 2001, now Pat. No. Des. 469,076.

(51) Int. Cl.[7] ............................................. G11B 21/12
(52) U.S. Cl. ..................................... 369/27.01; 369/64
(58) Field of Search ................................ 369/27.01, 65, 369/20, 19, 21, 22, 23, 25.01, 29.02, 30.02, 63, 64, 68

(56) References Cited

U.S. PATENT DOCUMENTS

| | | | | |
|---|---|---|---|---|
| 4,120,037 A | * | 10/1978 | Sato | 369/6 |
| 5,515,764 A | * | 5/1996 | Rosen | 84/484 |
| 6,022,262 A | * | 2/2000 | Gill | 369/63 |
| D469,076 S | * | 1/2003 | Goolkasian | D14/160 |
| 6,690,912 B1 | * | 2/2004 | Vaughn | 434/308 |

* cited by examiner

Primary Examiner—Tan Dinh
(74) Attorney, Agent, or Firm—Oblon, Spivak, McClelland, Maier & Neustadt, P.C.

(57) ABSTRACT

A desktop sound producing device for playing audio recordings from pre-recorded media having a plurality of individual selections recorded thereon. The device has a pyramid shaped housing having four side walls extending upward from a bottom wall to an apex forming a cavity therein. A playback mechanism is positioned within the cavity, and includes a means for storing pre-recorded media, and a processing means capable of providing an audio output signal from the pre-recorded median and amplifying the audio output signal for reproduction of the pre-recorded media through a speaker. The processing means can include an optical scanning system for reading pre-recorded media located on a compact disk. A control panel extends outwardly from one of the walls and includes a plurality of depressable keys electrically coupled to the processing means, wherein at least one of the keys is available for playing a single selection from the pre-recorded media. The control panel further includes and at least one said key coupled to a memory means for replaying a selected selection from the pre-recorded media.

11 Claims, 5 Drawing Sheets

AUDIO RECORDING PLAYBACK DEVICE

CROSS REFERENCE TO RELATED APPLICATIONS

This application is a continuation-in-part of applicant's U.S. application Ser. No. 29/152,730 filed Dec. 21, 2001 now U.S. Pat. No. D. 469,076, the contents of which are hereby incorporated by reference.

FIELD OF THE INVENTION

This invention relates generally to audio devices for amusement and/or educational purposes, and more particularly to a audio playback device which is operable to play selections stored on pre-recorded media either sequentially or by a selective memory playback.

BACKGROUND OF THE INVENTION

Audio equipment for playing prerecorded digital sound recordings, such as compact disks (CD) is known in the art. Such sound recordings are commonly available to the consumer in industry standardized formats that are readily replayed on most any type of audio equipment having a matching reader. The audio recording is not limited to songs and includes recitations of famous quotes, poetry, inspirational passages, biblical quotes, historic audio clips, great moments in sports, and so forth. For these types of recordings, it would be preferable that the recordings be played in a one-at-a-time fashion, rather than serially, as would occur with standard CD player used with replaying of songs. This intermittent playback would advantageously allow a listener to more fully comprehend and appreciate the information being conveyed in the sound recording. Current playback devices commonly have various controls that allow the consumer to play back the entire disk either sequentially, randomly, or advance to a particular track with possible repeat. What is lacking in the art is a device specifically directed to the replay of prerecorded quotes, poetry, inspirational passages, biblical quotes, historic audio clips, great moments in sports, and so forth that allows the consumer to replay the chosen track by storage of the track in a processor controlled memory bank.

In view of the foregoing, the present invention contemplates a novel device for amusement, entertainment and educational purposes which plays digital sound recordings with a processor that allows selection and replay of customer selected tracks.

SUMMARY OF THE INVENTION

It is an objective of the invention to provide a novel audio device having an ascetically pleasing pyramid-shaped housing having an integrated playback device for replaying audio recordings from pre-recorded media including individual selections recorded thereon.

It is another objective to provide a control panel with the playback device which includes manually activated memory storage pushbuttons operable to play the individual selections on the disk intermittently.

It is a further objective of the invention to provide a novel audio device having a pyramid-shaped housing having concealed receptacle for receiving a compact disk or the like storage device.

In accordance with the above objectives, an audio recording playback device is provided having a pyramid shaped housing with a playback mechanism for playing audio recordings from pre-recorded media. The pyramid shaped housing having four side walls extending upward from a bottom wall to an apex forming a cavity therein. An LCD or LED clock may be positioned in one of the side walls of the housing proximate the apex. A playback mechanism positioned within the cavity includes a memory chip for storing pre-recorded media, a processor means capable of providing an audio output signal from the pre-recorded media and amplifying of an audio output signal for reproduction of the pre-recorded media through a speaker. The processing means will include an optical scanner for reading pre-recorded media located on a CD. A control panel extends outwardly from one of the walls and includes depressable keys electrically coupled to the processing means. At least one of the keys is available for playing a single selection from the pre-recorded media or the selections can be played back sequentially or in random order. The control panel further includes and at least one said key coupled to the memory chip for replaying a selected selection from the pre-recorded media. Power for the device can be from DC batteries or alternating current.

DETAILED DESCRIPTION OF THE INVENTION

Figure 1:
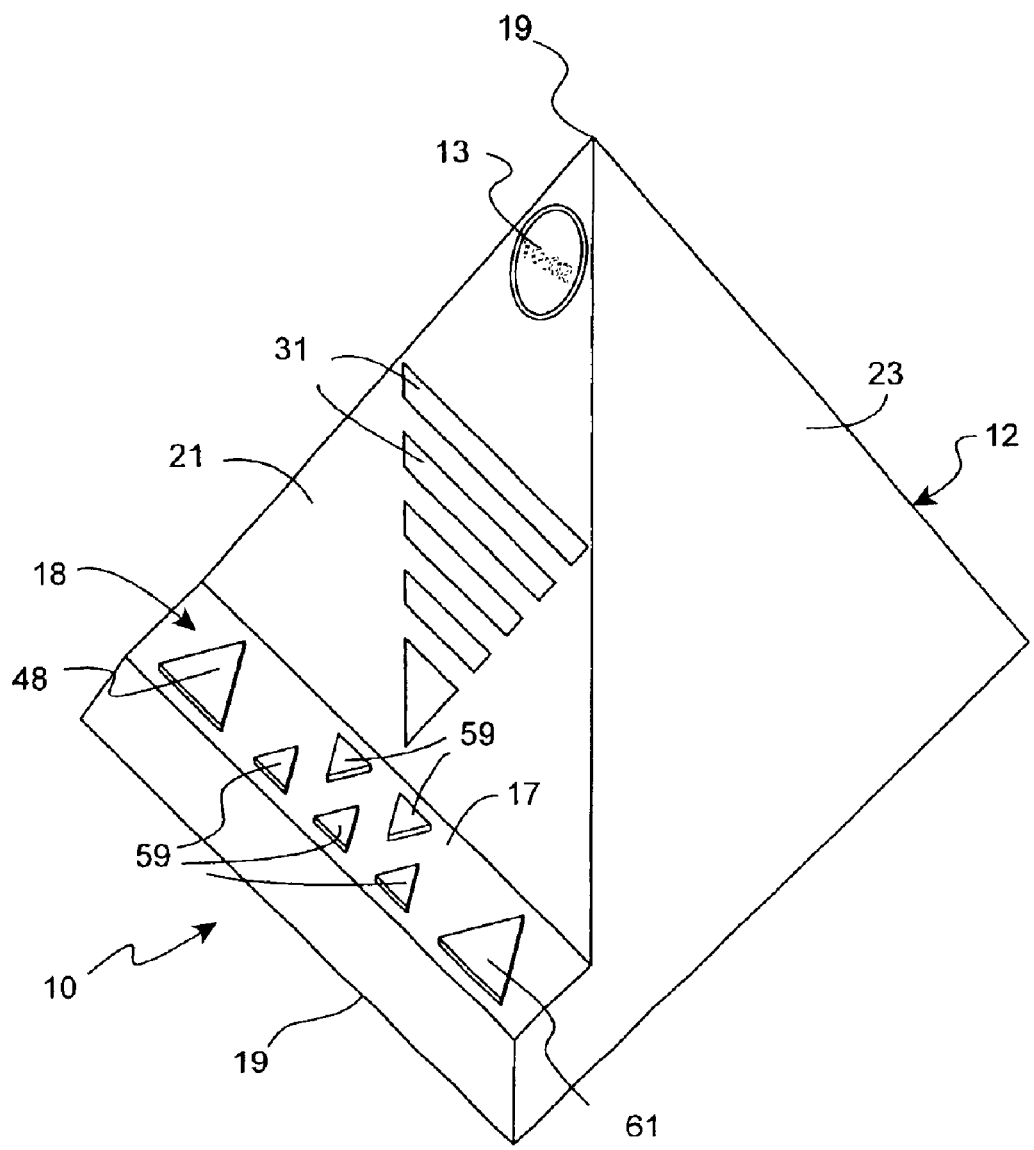
FIG. 1 is a perspective view of the sound recording playback device according to a preferred embodiment of the invention.
Figure 2:
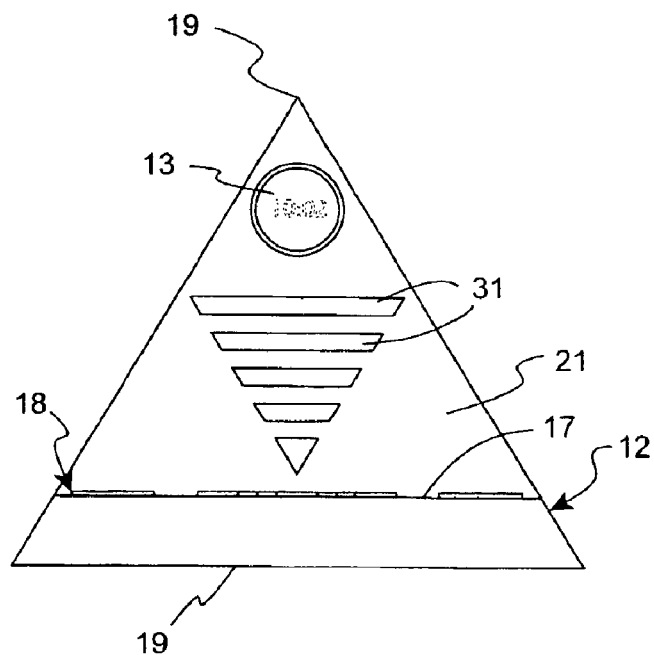
FIG. 2 is a front elevational view of the sound recording playback device of FIG. 1.
Figure 3:
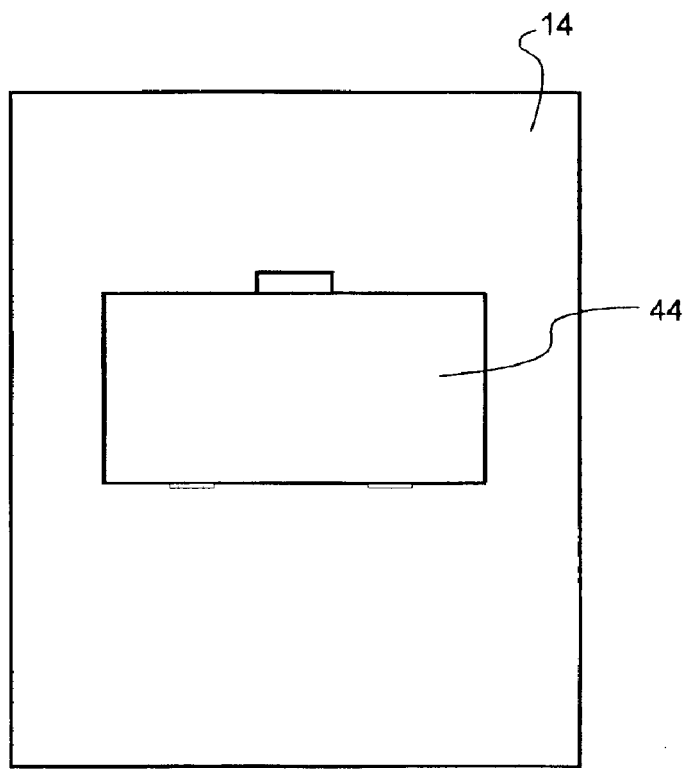
FIG. 3 is a bottom view of the sound recording playback device of FIG. 1.

Although the invention will be described in terms of a specific embodiment, it will be readily apparent to those skilled in this art that various modifications, rearrangements, and substitutions can be made without departing from the spirit of the invention. The scope of the invention is defined by the claims appended hereto.

FIGS. 1–5 illustrate the device 10 of the present invention which is audio device 10 having a novel configuration and designed to play pre-recorded digital media with memory keys for repeating media playback of particular interest. In the preferred embodiment, the device 10 is operable to play audio CDs in digital or compressed MP3 format. In alternatives to the invention, the device 10 can be configured to play other types of digital pre-recorded media.

In accordance with the preferred embodiment of the invention, the device 10 has a pyramid-shaped housing 12 having a flat rectangular base 14 sized for convenient placement on a support surface such as a desk. From the base 14 are four triangular shaped side walls namely a front surface 21, opposing left and right side surfaces 22, 23, and rear surface 24, which converge at an apex 19 and forming a housing with a cavity therein. The housing 12 can be constructed from any suitable rigid material, and is preferably formed from injection-molded plastic. The front side wall 21 is inset from the front edge 19 so as to form a planar ledge 17 which contains a control panel 18. At least one side wall 21 includes speaker apertures 31 so as to conceal the speaker but allow sound to emanate from the device. The configuration of the speaker apertures 31 can be stylized as shown to form a generally triangular shape.

Figure 7:
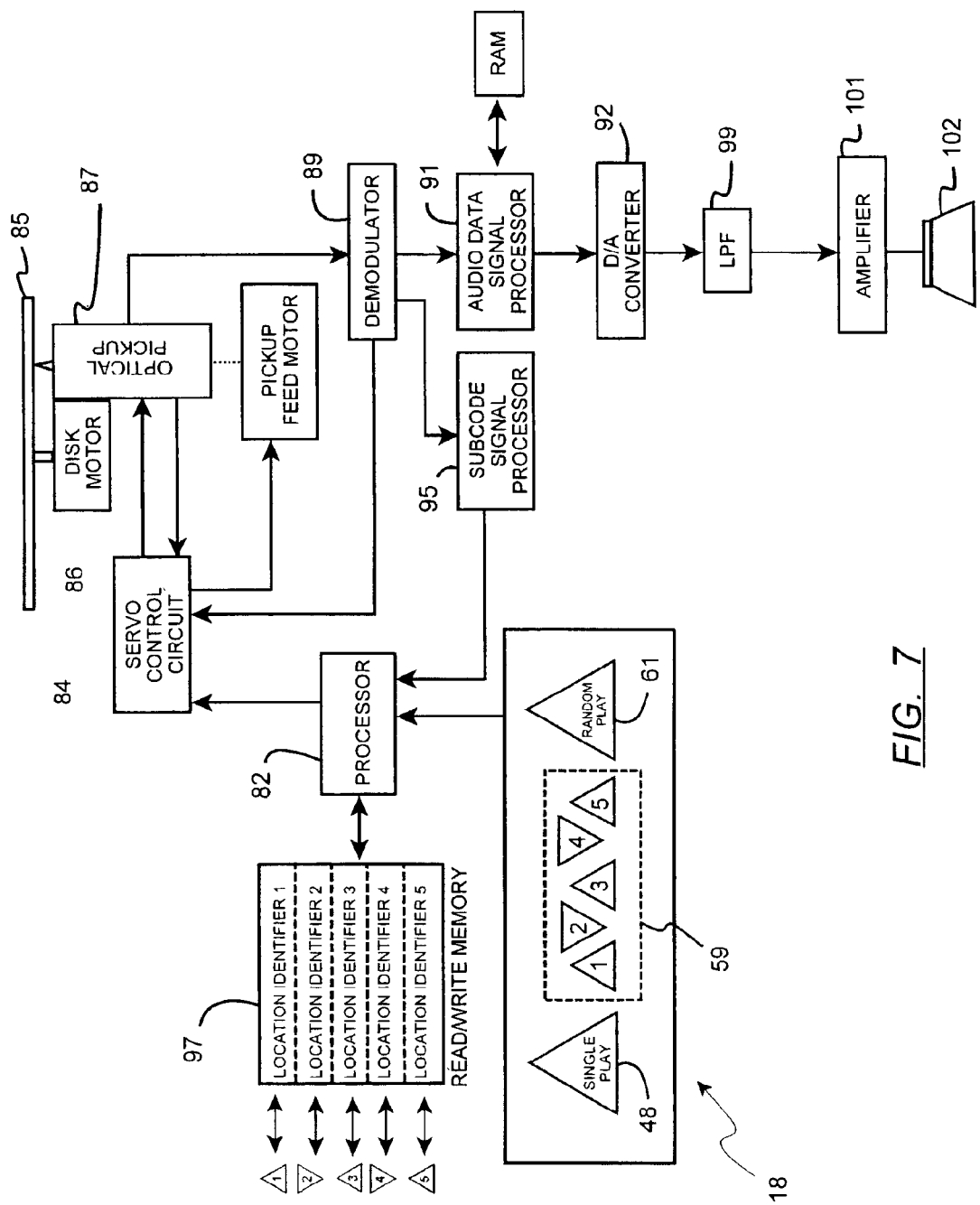
FIG. 7 is a schematic illustration of the playback mechanism and the control panel of sound recording playback device of FIG. 1.

In the preferred embodiment, the pyramid-shaped housing 12 houses a playback mechanism 80 which is schematically illustrated in FIG. 7. The playback mechanism 80 is operable to play audio recordings from pre-recorded media. In the following description, the playback mechanism 80 is an audio CD player, however the invention is not limited in this regard. The invention contemplates the use of any suitable audio playback mechanism operable to play pre-recorded media in a digital formal or in compressed MP3 format. For example, the invention could also utilize a playback mechanism for MiniDiscs, cassettes, memory chips, and so forth.

Figure 4:
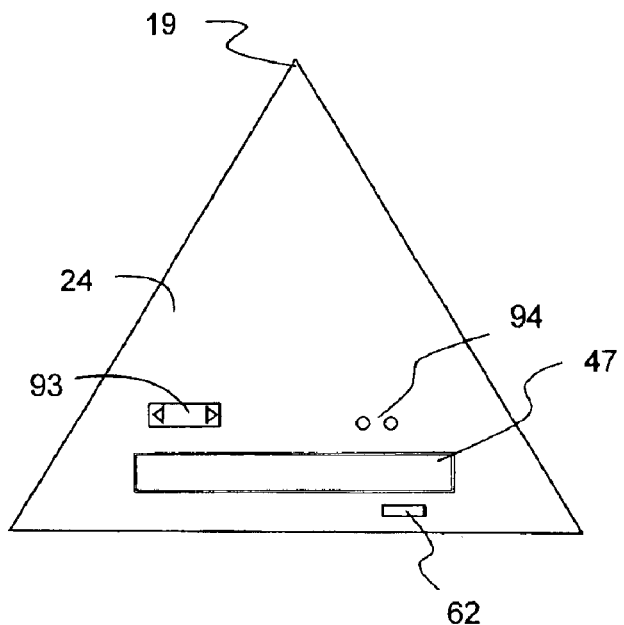
FIG. 4 is a rear elevational view of the sound recording playback device of FIG. 1.
Figure 5:
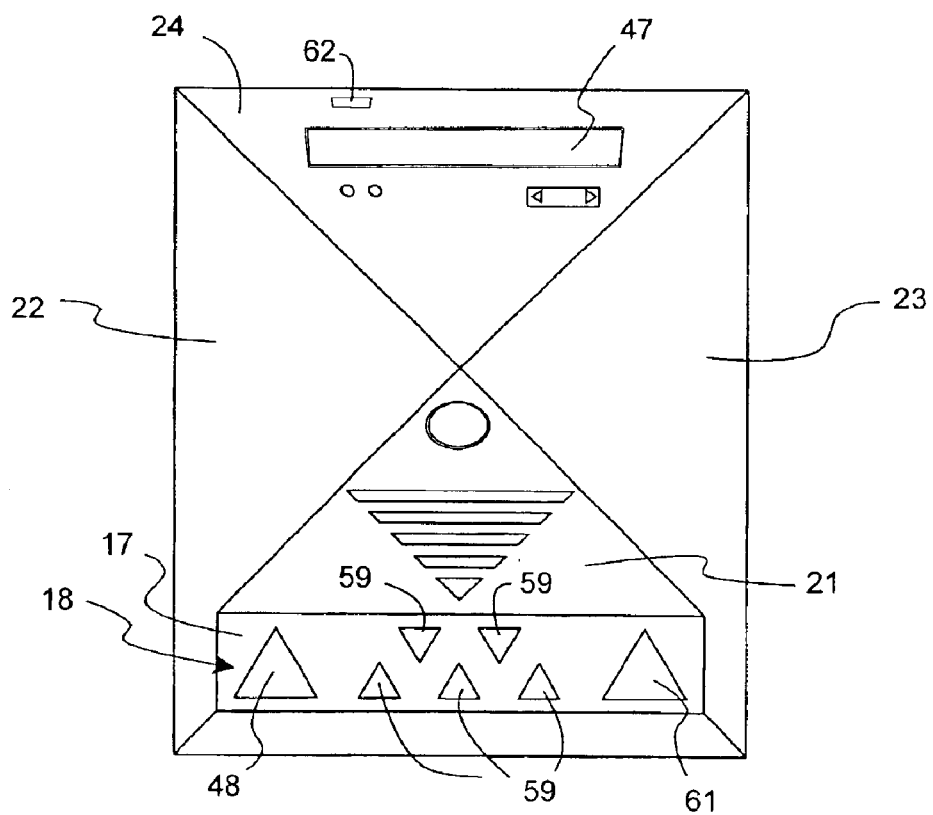
FIG. 5 is a top view of the sound recording playback device of FIG. 1.

As seen in FIG. 4, the rear surface 24 of housing 12 includes a CD receptacle 47 of the type commonly known in the art which is operatively coupled to the playback mechanism 80. The CD receptacle 47 can be configured as a slide-out tray, as shown, or can be a slot. The housing 12 includes an ejector button 62 for the insertion and removal of a CD. The playback mechanism 80 is electrically coupled to a power source. In the preferred embodiment, the playback mechanism 80 is powered by DC batteries. As seen in FIG. 5, the lower surface can include a compartment 44 to receive the batteries. The playback mechanism 80 can also be coupled to a power cord for connection to an AC outlet. The rear surface 24 can also include a manual volume control 93.

Referring again to FIG. 7, it is seen that the playback mechanism 80 includes a processor 82 electrically coupled to the control panel 18. The control panel 18 includes a plurality of manually depressable keys, including single play key 48, a plurality of pre-set keys 59 for selected replay of a predetermined selection, and a random play key 61.

The instrumentalities and operation of audio CD players are well known in the art. Any suitable CD player design can be utilized in accordance with the principles of the invention. The design of the audio CD player as described herein is only representative of a typical arrangement, and is delineated for ease of description of the invention.

The processor 82 is a microprocessor which controls the operation of the playback mechanism 80. The processor 82 outputs a drive control signal to a servo control circuitry 84 which drives the CD 85. The servo control circuit 84 controls the rotational speed of a disk motor 86 for rotating the CD 85, so that the linear velocity of a track of the CD 85 becomes constant. The servo control circuit 84 performs focus servo and tracking servo of an optical pickup 87 for radiating a laser beam onto the track of the CD 85. In the focus servo, a focus error is detected on the basis of a state of reflected light of the laser beam, and an objective lens in the optical pickup 87 is driven in an optical axis direction. In the tracking servo, the optical pickup 87 is radially moved by a pickup feed motor 88 while detecting an offset of the laser beam from the center of the track of the CD 85, and for a very small offset caused by the eccentricity of the disk, an internal lens of the optical pickup 87 is moved to follow the track, so that the laser beam emitted from the optical pickup 87 can be accurately radiated on the center of the track of the CD 85.

The optical pickup 87 detects pulse code modulation signals on the basis of the amount of reflected light from the radiated laser beam from the surface of the CD. Subcode data is encoded into the recordings with disk location data as well as other information in alphanumeric form. The demodulator 89 detects the audio and subcode data and outputs the audio data to the audio data processor 91 and the subcode data to subcode signal processor 95. The audio data processor 91 outputs the digital audio data to the D/A converter 92. If the audio data is in MP3 format, the demodulator 89 outputs the audio data to an MP3 decoder (not shown), and the data is then sent to the D/A converter 92. The D/A converter 92 converts the input audio data into analog audio signals, and outputs the analog audio signals. The analog audio signs are supplied to an amplifier 101 and a loudspeaker 102 via a low pass filter 99, and are then produced as sounds.

An integral aspect of the invention is the nature of the sound recordings to be played by the device 10. In accordance with the principles of the invention, the sound recordings are of the nature of relatively brief, spoken passages. Suitable subject matter could include famous quotes, poetry, inspirational passages, biblical quotes, historic audio news clips, great moments in sports, brief foreign language lessons, motivational and self-improvement quotations, jokes, vocabulary lessons, and the like. The recordings would be preferably be on CDs, which can be readliy interchanged by the user as desired. The selection of recordings on a single CD have a common theme, e.g. only motivational speeches, or only famous quotations.

The device 10 differs from prior art audio devices in that the selections on the CD are played in a one-at-a-time fashion which is manually actuated. Manually depressing the single play key 48 directs the processor 82 to play a single selection initialize the playback mechanism 80 to an ON state, play a single selection from the CD, and then return to a STAND-BY state. The subcode data in the CD directs the playback mechanism 80 to the correct selection with each successive actuation of the single play key. When the single play key 48 is depressed, the selections on the CD are played in sequence. To randomly play a selection on the CD, the random play key 61 is depressed.

In the event the listener hears a given selection, and wishes to return repeatedly to that selection, the device 10 includes a memory means to store the location on the CD of the selection for repeated play. Each individual selection on the CD includes a location identifier in the form of subcode data. The subcode data can encode the absolute and relative position of the laser in the track. As seen in FIG. 8, the subcode data is transmitted by the subcode signal processor 95 to the processor 92. A read/write memory 97 is in communication with the processor 82. The processor 82 can store location identifier information in the read/write memory 97 in association with each of the plurality of pre-set keys. In use, the listener would press the desired pre-set key 59 either during the selection play or immediately after the desired selection is played. To store the location of a selection, a pre-set key 59 is held down for a predetermined interval, e.g. 5 seconds. Successful completion of the pre-set function can be confirmed to the user by an audible signal. The location on the disk of that particular selection is sent to the processor 82 in the form of subcode data. The processor 82 stores a location identifier for the particular selection in the read/write memory 97 in association with the selected pre-set key. When the pre-set key is depressed, the location identifier for that pre-set key is retrieved and the disk drive advances to that particular selection, and the selection is played. The playback mechanism 80 then returns to a STAND-BY state.

Figure 6:
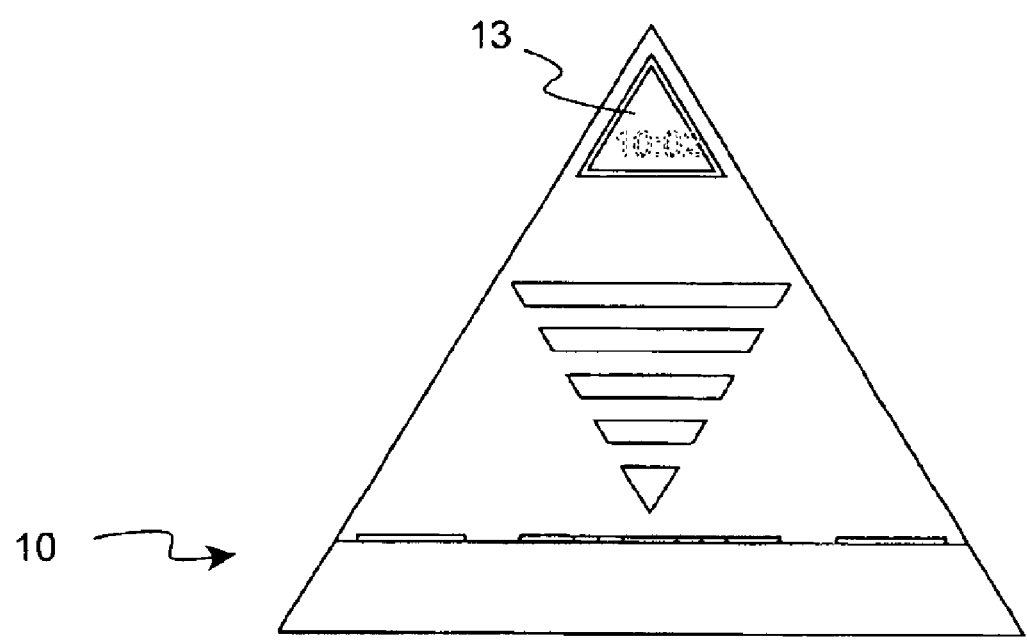
FIG. 6 is a front elevation view of an alternative embodiment of the sound recording playback device having a LED display in a triangular configuration.

Referring again to FIG. 1, the device 10 includes an LED display 13 mounted in the front side surface 21 proximate to the apex of the pyramid-shaped housing. In the preferred embodiment, the LED display 13 is a clock which displays the time. FIG. 6 illustrates an alternative configuration of the LED display 13 having a triangular shape. In addition to displaying the time, the LED display 13 can be coupled to the processor 82 so that other information can be displayed, such as alphanumeric information or graphics coded in the subcode data for a specific selection. The back surface 24 can include time set controls 94 to set the clock time. In an alternative embodiment, the clock can also have an alarm function.

The exterior of the pyramid-shaped housing 12 can be decorated with logos, sports team symbols, religious designs etc. as would be appropriate for the type of recordings being played. The device 10 can be a promotional item, or a souvenir-type item. For example, the exterior of the housing 12 can be decorated with the logo of a particular sports team or school, and the recordings played on the device 12 can be sports highlights for the team.

The pyramid shape can be said to have a culturally connotative significance. The inventive concept as disclosed herewith includes the combination of the of the distinctive sound recordings with the novel pyramid configuration of the playback mechanism. The device 10 thus has a unique function, and an entertainment and educational value that is not disclosed or suggested in the prior art.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

I claim:

1. A desktop sound producing device for playing audio recordings from pre-recorded media having a plurality of individual selections recorded thereon comprising:
    (a) a pyramid shaped housing having four side walls extending upward from a bottom wall to an apex forming a cavity therein;
    (b) a playback mechanism positioned within said cavity, said playback mechanism including a means for storing pre-recorded media,
    (c) said pre-recorded media including audio and subcode data;
    (d) a processing means capable of providing an audio output signal from said pre-recorded media and amplifying the audio output signal for reproduction of the pre-recorded media through a speaker;
    (e) a subcode signal processing means capable of transmitting said subcode data to said memory via a processor;
    (f) a control panel extending outward from one of said walls, said control panel having a plurality of depressable keys electrically coupled to said processing means, at least one said key available for playing a single selection from the pre-recorded media and at least one other of said keys including a memory means for replaying a selected selection from the pre-recorded media; and
    (g) a power source for said playback mechanism
        wherein said memory means includes a memory chip, electrically coupled to at least one of said keys, wherein subcode data is stored such that a specific selection of said plurality of selections may be chosen allowing play back of said specific selection upon depression of an electrically coupled key, said stored subcode data identifying the location on the pre-recorded media at which said specific selections is located.

2. The desktop sound producing device according to claim 1, wherein the subcode data references the location of said selections on the recording media, said subcode data being stored in a memory chip electrically coupled to at least one of said keys allowing play back of a selection upon depression of the key.

3. The desktop sound producing device according to claim 1, wherein the selections on the pre-recorded media are played back in random order.

4. The desktop sound producing device according to claim 1, wherein the selections are played back in sequential order.

5. The desktop sound producing device according to claim 1, wherein said processing means includes an optical scanning system for reading pre-recorded media located on a compact disk.

6. The desktop sound producing device according to claim 1, wherein said power source is batteries disposed in said housing.

7. The desktop sound producing device according to claim 1, wherein said power source is alternating current supplied through a power cord.

8. The desktop sound producing device according to claim 1, further including a digital time display positioned on one of said walls.

9. The desktop sound producing device according to claim 1, wherein said digital time display further displays information transmitted from subcode data in the CD.

10. The desktop sound producing device according to claim 1 wherein said pre-recorded media is composed primarily of spoken passages.

11. The desktop sound producing device according to claim 2 wherein said pre-recorded media is composed primarily of spoken passages.

* * * * *